April 3, 1945. A. W. BURDETT ET AL 2,373,012
PROCESS AND APPARATUS FOR MOLDING BREAD DOUGH
Original Filed Jan. 29, 1944 2 Sheets-Sheet 1
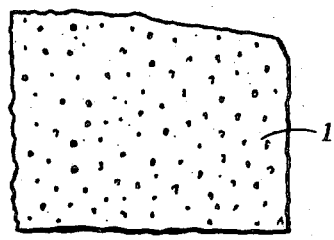
Fig. 1
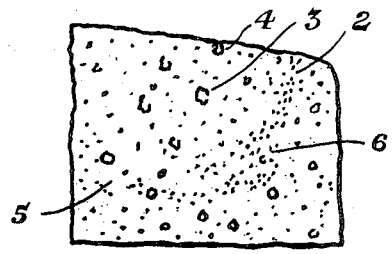
Fig. 2
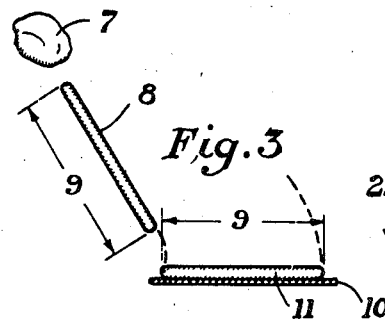
Fig. 3
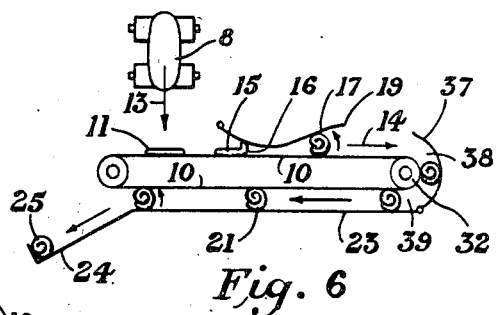
Fig. 6
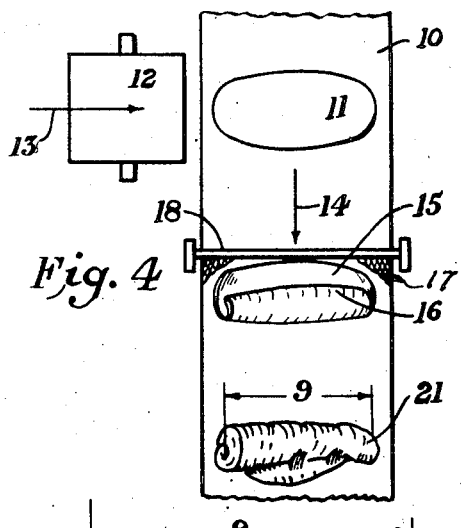
Fig. 4
Fig. 5
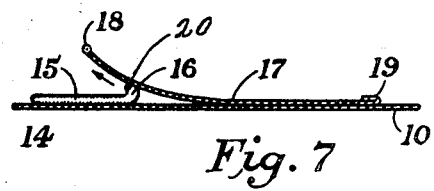
Fig. 7
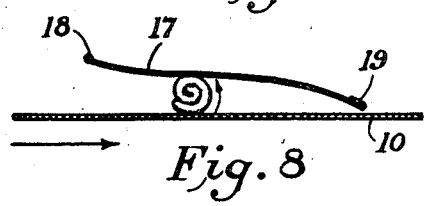
Fig. 8
Inventors
Albert W. Burdett
Richard Tannous
Albert E. Tolley
By Benj. T. Rauber, their Attorney April 3, 1945.   A. W. BURDETT ET AL   2,373,012
PROCESS AND APPARATUS FOR MOLDING BREAD DOUGH
Original Filed Jan. 29, 1944   2 Sheets-Sheet 2

Patented Apr. 3, 1945

2,373,012

UNITED STATES PATENT OFFICE 2,373,012

PROCESS AND APPARATUS FOR MOLDING BREAD DOUGH

Albert W. Burdett, New York, Richard Tannous, Pelham Manor, and Albert E. Tolley, Garden City, N. Y., assignors to Ward Baking Company, New York, N. Y., a corporation of New York Continuation of application Serial No. 520,260, January 29, 1944. This application August 8, 1944, Serial No. 548,580

17 Claims. (Cl. 107—54)

Our application is a continuation of our co-pending application Serial No. 520,260, filed January 29, 1944.

Our invention relates to a process and apparatus for molding bread dough for baking loaves.

The quality and texture of bread is influenced very markedly by the molding of lumps of dough into loaves for baking. In an effort to avoid large holes or voids it has heretofore been customary to pass the lumps of dough through successive pairs of rolls whereby the lumps are flattened and elongated into sheets, or pancake forms, and then to curl the flattened dough in the same direction as that in which it passes through the sheeting rolls. The sheeting step served to squeeze out or break up the larger holes and pores and to stretch or work the cellular structure of the dough in the direction of elongation and thus refine the "grain." In the curling step the dough was squeezed and compacted in the same direction as in the sheeting step and particularly at or near the surfaces of the sheet, or pancake, and the resulting loaf of bread was toughened and hardened in corresponding layers of the resulting scroll.

The uneven texture produced thereby might be observed in the form of whorls in the resulting bread when sliced crosswise. Moreover there was a tendency to enclose air pockets, or a failure to eliminate them during curling, leaving large voids or holes in the loaf. Inasmuch as the elongation was primarily in a single direction transverse of the loaf, the porosity was not uniform in a direction lengthwise of the loaf and transverse of the direction of rolling.

The localized compacting and variation in pore or cell size also gave slices of the bread a darker and non-uniform color, inasmuch as a white color is obtained by small uniform reflecting surfaces, whereas large pores cause shadows and compacted layers do not have good reflecting surfaces. Both of these divergencies from a uniform, small, cell size tended to darken the appearance of the bread slices. The outer surface of the loaves was hardened particularly by curling in the same direction as the sheeting, which resulted in a harder crust on the baked loaf.

These various irregularities in the loaf are obviated by our present invention which produces a loaf of substantially uniform cellular structure with a uniform size of pores and without localized hardening or toughening. Also bread is produced by our present process which has a more tender crust.

In our present invention the mass of dough is sheeted in one direction, as by passing through a series of rolls and preferably extended to a length approximating that of the loaf to be formed. The sheet is then curled in a direction transverse to its direction of sheeting, preferably at right angles thereto and curled into a scroll. The grain or cell structure is thus stretched or worked in cross directions avoiding the danger of overworking in either direction and providing greater evenness and uniformity of structure. Also large cells or voids are broken down more effectively and uniformly and the opportunity for the entrapment and the inclusion of air and the formation of air pockets in the molded dough is avoided. The resulting curled loaf need not be rolled as tightly as is necessary when the sheet is curled in the same direction as its elongation during sheeting.

In changing the direction of movement of the dough between the sheeting and the curling steps, the sheeted dough is preferably tossed or flicked from the last roll of the sheeting series flatwise onto a belt conveyor moving in a direction transverse to or at a right angle to the movement through the sheeting rolls and is carried in the transverse direction of movement of the belt. During the transverse movement the advancing or leading edge of the sheet is then curled and the sheet rolled to a completed scroll while moving in a direction transverse to that of its movement through the sheeting rolls.

The various features of our invention are illustrated by way of example in the accompanying drawings in which Figs. 1 and 2 are comparative views of slices cut lengthwise from two baked loaves made from the same batch of dough. The dough piece of Fig. 1 was molded in the method and apparatus of the present invention; the dough piece for Fig. 2 was molded in a conventional drum-type molder;

Fig. 3 is a schematic view, showing the path of travel of a dough piece, in the first two steps of its travel through the molder, namely, flattening, transferring and depositing on a traveling belt;

Fig. 4 is a diagrammatic plan view of the belt and of the dough piece being coiled thereon;

Fig. 5 is an enlarged perspective view showing the coiled-up piece as it leaves the coiling device, its trailing edge having been slightly opened to show the coalescing action of the dough;

Fig. 6 is a schematic diagram of a molder embodying the present invention and showing the travel of the dough pieces during the coiling and coalescing operations;

Figs. 7 and 8 are diagrammatic views showing the arrangement and operation of the coiling device and the top run of the conveyor belt, Fig. 7 showing the dough piece entering the coiler, Fig. 8 showing its position as it is about to leave the coiler;

Figure 9:
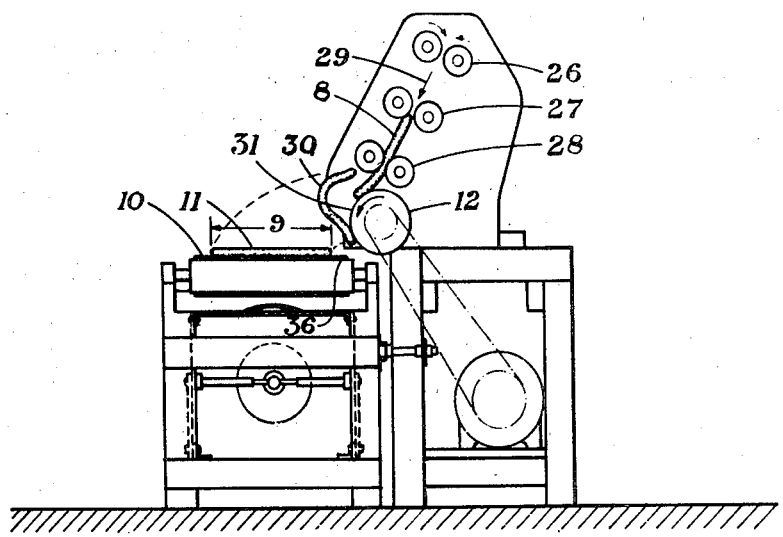
Fig. 9 is an end elevation of a dough piece molder partly in section, embodying the invention in a preferred form, certain parts being omitted to simplify the description.

The texture of the cut surface 1 in Fig. 1 is even and uniform, large voids are absent and the top crust is smooth and tender; whereas the cut face 2, Fig. 2, has numerous voids 3 of considerable size and the top crust has pockets 4. Moreover, the face 2 shows whorls, indicated by the lines 5, and occasional uneven areas 6, presenting a loaf structure not uniform in texture and porosity.

The commercially satisfactory uniform slice, Fig. 1, and the less satisfactory product, Fig. 2, owe their different qualities almost entirely to the improved mode of operation which is characteristic of the molder herein described; all the other baking operations such as dough mixing, dividing, proofing and baking being identical for both slices. The texture shown in Fig. 1 is preferred by consumers on account of its attractive appearance and superior eating qualities.

The diagrammatic views Figs. 3 to 8, inclusive, depict the mode of operation of a molder embodying the present invention.

Figure 10:
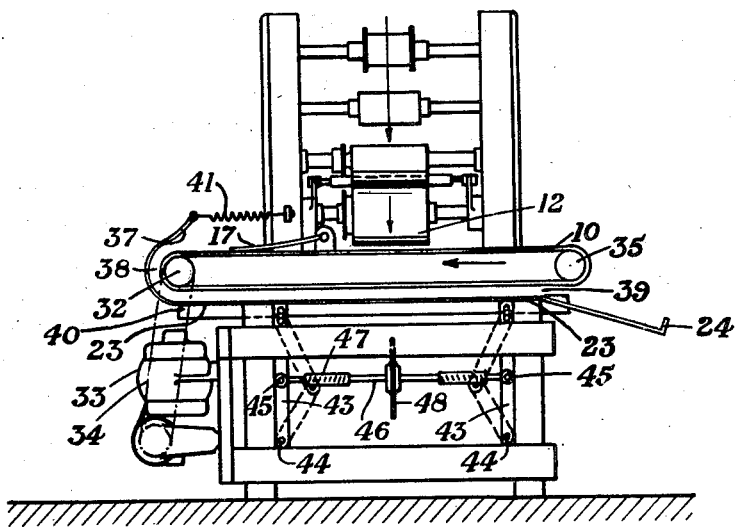
Fig. 10 is a front view of the molder shown in Fig. 9 with parts removed.

Referring to Fig. 3, numeral 7 indicates a lump of dough of predetermined weight and size conditioned ready for molding. The first operation in the molder is to form the piece 7 into thick pancacke shape, shown edgewise at 8. The longest dimension, 9, of dough piece 8 is preferably made somewhat less than the length of the pan in which the loaf is to be baked. Any suitable means may be employed to form the lump into the flat shape 8, although the train of sheeting rolls shown in Figs. 9 and 10 is preferred.

The flat thick piece 8 having been formed, it is at once deposited on the top run of a traveling conveyor belt 10 with its longest dimension, 9, lying crosswise of the belt. It is preferably deposited by being flipped or tossed from the position 8 so as to fall freely in the manner indicated by the broken curved arrow in Fig. 3. The piece lands evenly in flat position on the conveyor and inverted.

In the diagrammatic plan view Fig. 4 the piece 11 is shown as it lands on the face of the belt 10. The arrow 13 indicates the line of travel of the dough piece 8 toward the belt 10 and the arrow 14 indicates the line of travel of the belt.

Referring now to schematic Fig. 6, the upper run of belt 10 is shown traveling toward the right carrying the flattened dough piece along. The piece 15 while in transit commences to coil up when its advancing edge 16 engages the flexible dough piece coiler 17, as is shown in enlarged detail, Fig. 7.

Coiler 17 comprises a broad flexible rectangular flap-like member preferably made of wire mesh, mesh chain, or other yieldable material of weight appropriate for the duty required of it. Its width is about the same as the width of belt 10. One end is secured to a supporting bar 18 located above and spanning the width of the conveyor, as indicated in Figs. 10 and 4. A considerable portion of the apron-like dough piece coiler 17 normally drags on the upper face of conveyor 10, but its free edge portion 19 is adapted to be momentarily flexed and lifted by successive dough pieces as they pass in regular order underneath the coiler 17, from 18 to 19.

The mesh face of the coiler engages and bends the front edge 20 of the advancing dough piece 15 upwardly and gently commences to coil it upon itself. Thus the coiler converts each flat dough piece into loosely rolled-up scroll form while the piece is being carried flatwise on the upper run of the belt. Such a scroll, 21, is shown in Figs. 4 and 5. This scroll being made from a short thick flat pancake-like piece of dough 11, usually has only one, or one and a half turns, as distinguished from three to five turns heretofore deemed necessary. Also, it results from very gentle light-pressure rolling action, which leaves the ends of the scroll only moderately sealed so that any gas formed during further fermentation, or which may have been entrapped between the convolutions is allowed to escape more freely than is possible where multiple tightly rolled convolutions are used. This reduces the likelihood of large voids being developed in the finished loaf.

After the coil leaves the free edge 19 of coiler 17 it is ready for the bake pan except that a short time is required to allow the convoluted surfaces to coalesce and the scroll to become a unitary piece. In Fig. 5 the part 16 of the scroll 21 is shown as having been pulled away, to illustrate such coalescing portion 22.

To give the scroll the necessary time for becoming a unit it is caused to move over a stationary table surface 23 without slipping. Its motion is that of rolling a cask and is accomplished in the present machine by applying at the top and bottom of the scroll 21, Fig. 6, only enough pressure to produce the desired rolling movement and to hold the scroll to its original size.

The scroll is kept rolling by the movement of the bottom run of belt 10 toward the left in the direction of the arrow, Fig. 6, until the dough convolutions have had time to unite into one body. After coalescing the finished scroll is delivered from the machine, either into a catcher 24, or directly into a bake pan (not shown).

The dough pieces 25, upon leaving this molder, Fig. 6, have a rather crude appearance, as shown in the enlarged perspective view, Fig. 5, but after having been placed in the pans and expanding through fermentation, they nevertheless assume the shape of the pan and develop well formed crowns. The final baked loaf is acceptable in shape and appearance, and its texture and uniformity of cell structure are superior to that produced in earlier types of dough molders.

Having pointed out diagrammatically in Figs. 3 to 8 and having explained in general the structure and mode of operation of a molder embodying the invention, brief reference may be made now to certain earlier types of molders, in order to make comparisons that shall more clearly show the advantages, novel features and inventive ideas embodied in the new preferred structure as illustrated in Figs. 9 and 10.

Heretofore certain molding machines have been constructed on the theory that if dough lumps of uniform size are passed through sheeting rolls, as a first step in the molding operation, and if the rolls are set close enough to produce a thin sheet of dough, then all large bubbles of air or gas would be squeezed or wrung out and large cavities in the final loaf would be avoided.

In operation those earlier molders wound up the thin dough sheets into tight scrolls, usually three to five turns for each scroll. Again the coil was subjected to rolling and squeezing, the idea being to deliver only perfectly shaped cylindrical dough piece scrolls from the molder. Oven attendants came to regard the delivery of perfectly formed cylindrical dough scrolls as standard requirement for a good molding machine.

However, it has been found almost impossible to make a tight scroll of any considerable number of turns of thinly sheeted soft dough without entrapping undesirable random amounts of air between the convolutions or in the incipient colds or crevices of the dough. The air would finally expand upon heating, or mix with gas upon further fermentation and so create voids or holes in the finished loaf.

In the conception of the present invention the earlier theories just alluded to have been disregarded because it is realized that for most effective molding the machine should be adapted to perform all of the steps of a molding operation with the least possible amount of dough manipulation and without any avoidable degree of stretching, squeezing or otherwise "punishing" the light material.

Therefore, the present molder is designed to produce its dough scroll with as few winding convolutions as are feasible, with no unnecessary squeezing or working of the coil after it has been given its initial approximately cylindrical shape, Fig. 5, and finally to gently roll the scroll for a sufficient period of time to insure thorough coalescence or union into one mass, and deposit the same into a bake pan without any additional working or forming for the purpose of producing an accurately formed cylindrical shape.

From the explanation given of diagrammatic Figs. 3, 4 and 6, it will be recalled that dough lumps 7, of uniform weight and size, are formed into thick pancakelike pieces 8.

In Fig. 9 a series of conventional sheeting rolls are shown for that purpose, consisting of coacting pairs of rolls 26, 27, 28. They are arranged in a train that presents a downwardly sloped passageway 29. The speed of rotation of successive pairs is lowest at 26 the initial pair of the train, and fastest at 28 the delivery pair. The rolls are set far enough apart so that a dough piece 8 will be produced whose thickness and width are preferably such that the length 9 in the direction of the passageway 29 shall be a little less than the length of the pan in which the loaf is to be baked.

It is to be observed that the forming stress to which the lump of dough 7 is subjected in order to produce the thick dough piece 8 is only moderate, although adequate to squeeze out some of the gas already present in the lump. The squeezing action is carried only to a point where the longest dimension of the flattened dough piece is slightly less than the length of the pan. Under those conditions the gluten is adequately stretched without creating faults in the dough piece that ultimately can develop voids in the baked loaf.

Numeral 30, Fig. 9, indicates a thick dough piece which has emerged from the passageway 29 between the sheeting rolls and is being flicked onto the conveyor 10 so as to land on the belt flatwise, as at 11, with its lengthwise dimension 9 crosswise of the belt. This flicking is done by drum 12 as follows:

The cylindrical working surface 31 of the drum is smooth and revolves in the general direction of travel of dough pieces as they emerge from the rolls 28. Drum 12 is located lower than the train of sheeting rolls and has a portion 31 of its working face projecting into and through the passageway 29, extended. The flicking or tossing of piece 30 by drum 12 is accomplished without arresting the movement of the dough piece or of the belt. Piece 8 contacts the drum as shown and tends to follow around the drum and be projected out toward the left. As the piece departs from the last pair of sheeting rolls, 28, it is tossed so as to land flatwise on the moving conveyor 10. Any undesirable deforming of the shape of the dough piece is avoided because it lands on the belt evenly, all at once, and in correct alinement; whereas if only a part of the dough piece were to contact the belt at one time the belt movement would distort the piece.

The flicking action of drum 12 is a novel and advantageous means for transfer from sheeter rolls to a conveyor where abrupt change of direction of a flat dough piece without deformation is required.

The traveling apron conveyor or belt 10 is mounted on a driven roller 32, connected to a motor 33 by drive chain 34. The other end of conveyor 10 is mounted on an idler roller 35 provided with a suitable take-up device (not shown) for tensioning the belt. The top run of belt 10 may travel at right angles to the direction of delivery of the dough piece 8 from passageway 29, for example, toward the right, Fig. 6, or toward the left as in Fig. 10.

The purpose of this right angle arrangement of passageway 29 and drum 12 with respect to the direction of travel of the top run of the belt 10 is to feed the piece 8 in one direction along passageway 29 and immediately roll it up in a direction at right angles, as the next step in such a way as to expel any large bubbles that happen to be in the dough piece or else change them into a considerable number of very small bubbles. Also the dough is gently worked in a direction transverse to its elongation in the sheeting rolls 26—28.

Fig. 4 shows that sheeting is in the direction of the arrow 13 and coiling is in the direction of arrow 14.

Referring more specifically to the location of drum 12 for tossing and inverting the dough piece, Fig. 9 shows that the top 10 of the conveyor belt is situated lower than the portion 31 of the working surface of drum 12 and the right-hand marginal edge 36 of the belt is about even with the left-hand rim portion of the drum.

It has been explained in connection with Figs. 4, 6, 7, 8 how a scroll is formed by a dough piece coiler 17 which is shown in Fig. 10, but is omitted from Fig. 9 for the sake of clarity.

A curved guide 37 is provided to direct the coiled dough piece around the end of the conveyor 10 and onto the lower stationary table 23. The guide 37 is made in the form of a semi-circular housing that extends around the delivery end of the run and presents an annular runway 38 to receive the coils as they emerge from coiler 17. Guide 37 conducts the pieces around half the periphery of the driven roller 32 and into the straight delivery passageway 39.

Guide 37 is hinged at its bottom edge 40 to the table 23 and its free end is urged toward the right, Fig. 10, by means of a light spring 41, that causes 37 to exert sufficient pressure against the coils to keep them rolling while passing around roller 32 and into delivery run 39, thus avoiding undue squeezing or pressure of the soft dough.

A stationary but adjustable table surface 23 is spaced below the return run of belt 10 which travels toward the right in the arrangement shown in Fig. 10 and toward the left in the modified form Fig. 6. Table 23 forms a bottom for delivery passageway 39; being normally immovable during the operation of the molder. The table is adjustable down and up for varying the vertical distance between itself and the lower run of the belt so as to change the height of delivery passageway 39, through which the rolled-up dough pieces pass toward their place of delivery 24. The purpose of changing the height of the passageway 39 is to enable the top portion of each coiled dough piece to be kept in contact with the bottom run of conveyor 10.

The height of passageway 39 should be appropriate to cause the movement of the conveyor to keep the scroll 25 rolling on table 23 until it comes to the end of run 39 where it is discharged.

Preferred means for raising or lowering the table 23 is shown in Fig. 10; consisting of a pair of toggles 43, 43, pivoted at their lower ends to a fixed support 44 and at their upper ends to the table. The middle joints 45, 45, of the toggles are connected together by a tie-rod 46 that can be lengthened or shortened by means of turnbuckle connections 47 operated by a conventional hand wheel 48 fixed to rod 46.

In use, the toggle device is adjusted to keep the lower run of the belt 10 fairly in contact with the tops of the coiled dough pieces from the time they leave the curved runway 38 until they are delivered from straight passageway 39 at the catcher 24.

From the description and drawings it will be clear that since the dough piece, Fig. 5, can be coiled up in from one to one and a half turns there can be only a minimum of superficial dough area requiring to be coalesced in order to create a unit mass free from whorls.

When the final dough piece had a great extent of such superficial area, as was the case when it was sheeted so thin as to require three to five turns to make up the coiled piece, then the likelihood of entrapping air between the convolutions was greatly increased and so it was deemed necessary to roll the piece forcibly in an attempt to squeeze air out from between such multiple convolutions. The overworked surface of the thin sheet resisted coalescing action and frequently developed in the final loaf a pronounced series of whorls, such as are present in the slice illustrated in Fig. 2.

Moreover, the thin sheeting and consequent tight rolling caused the convolutions at the ends of the coil to become sealed, thereby preventing gas from escaping at the ends of the roll while it was being formed.

All such disadvantages have been entirely overcome in the present molder by the novel arrangement and mode of operation of the sheeting, coiling and coalescing mechanism.

From the foregoing description, it will be seen that the molder herein described attains the stated objects of the invention, namely, to provide a molder of simplified structure wherein loaves of bread are produced with the desirable characteristics of uniform fine grain, improved color, absence of voids and crust breaks and possessing superior chewing qualities.

Chewing qualities are improved because of the regularity of the disposition of the cell walls in the fine-grained loaf, Fig. 1, and for that reason such texture is favored by consumers.

The fine even uniform grain of the cut surface, Fig. 1, gives the effect of increased whiteness, supposedly because the shadows in the small cavities of fine-grained loaf surfaces are not so intense as the shadows in larger cavities, Fig. 2, and therefore the whole slice takes on a whiter appearance, which is of commercial advantage in the baking industry.

Having thus described our invention, what we claim is:

1. A dough molder comprising in combination a train of pairs of rollers presenting a downwardly sloping passageway for dough pieces; a rotary drum situated with a portion of its rim extending across said passageway and adapted to be engaged by rolled flat pieces emerging from the train and adapted to flick said pieces in regular order away from the train; a conveyor extending transversely to the direction of emergence of the dough piece from said passageway, being situated to receive flatwise, dough pieces flicked from said drum; a coiling device cooperating with the upper run of said conveyor intermediate the ends thereof and adapted to coil the flat dough pieces into loosely formed scrolls; a table spaced below the bottom run of the conveyor and presenting a delivery passageway for dough pieces impelled by the said bottom run; and a curved annular runway for guiding newly formed scrolls into said delivery passageway, the combined length of the said annular runway and the delivery passageway being sufficient to cause the convolutions of the scrolls to coalesce and form each coiled dough piece into a unit mass before delivering it from said passageway.

2. In a machine for molding dough pieces and the like means for shaping a dough lump of predetermined size into a flat elongated piece; comprising coacting pairs of rolls arranged in a train presenting a downwardly sloped passageway, the distance apart of the rolls of each pair being such that the thickness and width of the flat elongated piece formed thereby shall be such that the length of the piece in the direction of the passageway shall be slightly less than the length of the pan in which said piece is to be placed for baking; a conveyor belt mounted below said train of rolls and adapted to travel substantially at right angles to the direction of said passageway; a drum mounted for rotation intermediate the said train and belt, a portion of the drum rim extending across the path of travel of dough pieces as they emerge from the rolls, being adapted to be engaged by and to flick said dough pieces flatwise onto the belt in regular order, the long dimension of each piece lying crosswise of the belt.

3. In a machine for molding dough pieces and the like; means for shaping a dough lump of predetermined size into a flat elongated piece, the longest dimension of which is slightly less than the length of a pan into which said piece is to be placed for baking; means for forwarding such flat piece in the direction of its length; a conveyor belt mounted below said shaping means and adapted to travel substantially at right angles to the direction of forwarding movement of said piece; a drum mounted for rotation intermediate the said shaping means and belt, a portion of the drum rim being situated across the forwarding path of said flat piece and adapted to be engaged thereby, the speed of said rim being appropriate to impel said piece so as to cause it to land flatwise on the belt, with the long dimension of the piece lying crosswise of the belt.

4. In a dough molder, a conveyor adapted to transport flattened dough pieces while subjecting them first to a coiling operation, secondly to a rolling and coalescing operation and finally delivering them from the machine; said conveyor comprising a belt having an upper run arranged for receiving said flattened pieces; a coiler apron located above and cooperating with said run intermediate the ends thereof to convert said flat pieces into scroll formation; said conveyor including a driven roller located at the end of said run; a curved guide extending around the driven roller and spaced therefrom to present an annular runway, the upper end of said guide being spring pressed toward the roller, the lower end of said guide being hinged at its bottom; a table spaced below the lower run of the belt and constituting the bottom of a delivery passageway communicating with the annular runway defined by said curved guide; means for adjusting said table to vary the vertical distance between itself and the lower run of the belt, thereby changing the height of such delivery passageway to enable the top portion of each scroll formation while in transit to be kept in contact with the bottom run of the conveyor.

5. In a machine for molding dough pieces and the like; means for shaping a lump of dough of predetermined size into flat elongated form comprising coacting pairs of rolls arranged in a train presenting a downwardly sloped passageway; a conveyor belt mounted below said train and adapted to travel substantially at right angles to the direction of said passageway; a drum mounted for rotation intermediate the train and belt, a portion of the drum rim adapted to be engaged by and to toss said dough pieces in the general direction of their travel through the passageway and to cause them to land on the belt flatwise and in regular order; a dough piece coiling means located above and cooperating with the top run of said conveyor belt for converting each flat piece into scroll formation; a driven roller supporting the conveyor at the end of said run; a yieldably mounted curved guide extending part way around the driven roller and spaced therefrom to present an annular runway; a table spaced below the bottom run of said belt and constituting the bottom of a delivery passageway communicating with the annular runway, the bottom run of the belt constituting a traveling top for said delivery passageway.

6. A dough molder comprising in combination a train of pairs of rollers presenting a downwardly sloping passageway for dough pieces, a conveyor extending transversely to said passageway to receive dough pieces from said passageway and a curling device to coil flat dough pieces on said conveyor in a direction transverse to said passageway into loosely formed scrolls.

7. A dough molder comprising a belt conveyor having an upper run and a lower run, a train of pairs of rollers presenting a passageway for dough pieces transverse to the direction of travel of said upper run of said conveyor and delivering said dough pieces thereon without change of direction, a curling device cooperating with the upper run of said conveyor to coil the flat dough pieces transverse to the direction of their movement through said passageway into scrolls, a table spaced below the lower run of said conveyor and forming therewith a delivery passageway for said curled dough pieces and a curved semi-annular runway for guiding scrolls from said upper run to the passageway below said lower run.

8. Apparatus for molding dough which comprises pairs of flattening rolls through which a mass of dough may pass in one direction, means for coiling the flattened mass from said rolls and means for feeding and orienting said flattened mass from said rolls to said coiling means in position to coil it in a direction transverse to its passage through said flattening rolls.

9. Apparatus for molding dough which comprises a downwardly extending series of pairs of spaced flattening rolls, a belt conveyor to receive the flattened dough from said rolls and moving in a direction transverse to the feed of dough through said flattening rolls and means to coil said flattened dough on said conveyor.

10. Apparatus for molding dough which comprises a downwardly extending series of pairs of spaced flattening rolls, a belt conveyor to receive the flattened dough from said rolls and moving in a direction transverse to the feed of dough through said flattening rolls, and means to coil said flattened dough on said conveyor which comprises a mesh secured at its forward end slightly above and overlapping said conveyor.

11. Apparatus for molding dough which comprises means for rolling a mass of dough in one direction to a flat shape, means coiling the flattened mass of dough and means for feeding and orienting said flattened mass from said rolls to said coiling means in position to coil it in a direction transverse to the direction of rolling.

12. A dough molder comprising a train of pairs of rollers presenting a downwardly sloping passageway for dough pieces, a conveyor extending transversely to said passageway to receive flattened dough pieces from said passage, a coiling device cooperating with the upper run of said conveyor intermediate the ends thereof to coil the flat dough pieces into loosely formed scrolls, a table spaced below the bottom run of the conveyor and presenting a delivery passageway for dough pieces impelled by said bottom run and a curved annular runway for guiding newly formed scrolls into said delivery passageway.

13. Apparatus for molding dough which comprises means for flattening and elongating a mass of dough in one direction, means for coiling the flattened mass and means for feeding and orienting said flattened mass from said rolls to said coiling means in position to coil it in a direction transverse to that of its elongation and flattening.

14. A process of molding dough which comprises rolling a mass of dough in one direction to a flat shape and then coiling the flattened mass of dough in a direction transverse to the direction of rolling.

15. A process of molding dough which comprises rolling a mass of dough in one direction to a flat shape, then coiling the flattened mass of dough in a direction transverse to the direction of rolling and coalescing said coiled mass by further rolling in the direction of coiling.

16. A process of molding dough which comprises flattening and elongating a mass of dough in one direction and then coiling it into a scroll in a direction transverse to that of its elongation.

17. Apparatus for molding dough which comprises means for flattening an elongated mass of dough in one direction, a belt conveyor to receive the flattened dough from said means and to move said flattened mass in a direction transverse to its direction of elongation and flattening and means to coil said flattened dough on said conveyor in a direction transverse to its direction of elongation.

ALBERT W. BURDETT.
RICHARD TANNOUS.
ALBERT E. TOLLEY.